Figure 1:
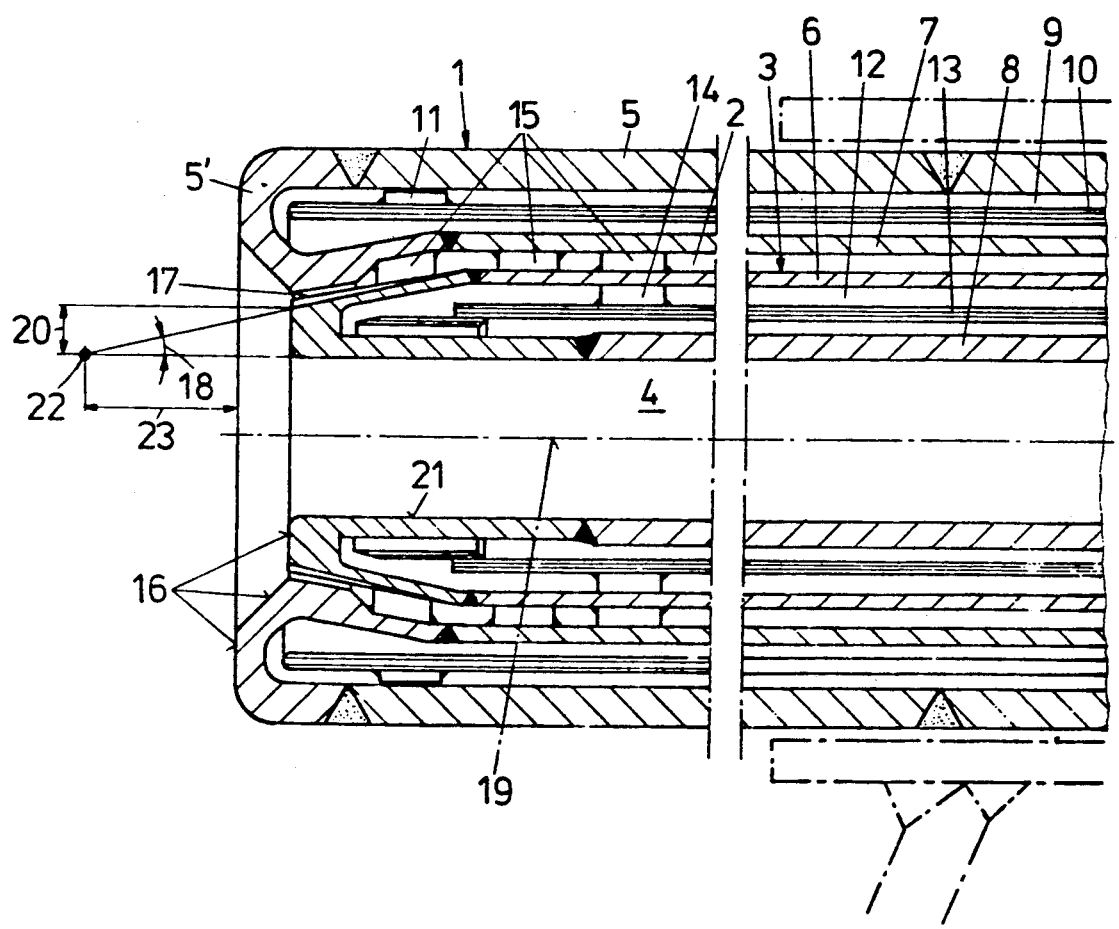

United States Patent [19]

Kepplinger et al.

[11] Patent Number: 5,127,346
[45] Date of Patent: Jul. 7, 1992

[54] BURNER ARRANGEMENT FOR THE COMBUSTION OF FINE-GRAINED TO DUSTY SOLID FUEL

[75] Inventors: Leopold-Werner Kepplinger, Leonding; Wilhelm Schiffer, Traun, both of Austria; Rolf Hauk, Achern, Fed. Rep. of Germany

[73] Assignee: Vooest-Alpine Industrieanlagenbau GmbH, Fed. Rep. of Germany

[21] Appl. No.: 776,632

[22] Filed: Oct. 15, 1991

[30] Foreign Application Priority Data

Oct. 15, 1990 [AT] Austria .................. 2076/90

[51] Int. Cl.$^5$ .................................. F23D 1/02
[52] U.S. Cl. ............................. 110/264; 110/263; 239/132.3; 239/399; 239/403; 239/424; 431/160
[58] Field of Search ........... 110/263, 264, 347, 265; 431/160, 181, 182; 239/132.3, 399, 403, 423, 424

[56] References Cited

U.S. PATENT DOCUMENTS

| | | | |
|---|---|---|---|
| 4,350,103 | 9/1982 | Poll | 110/264 |
| 4,510,874 | 4/1985 | Hasenack | 110/347 |
| 4,519,321 | 5/1985 | Poll et al. | 110/263 |
| 4,523,529 | 6/1985 | Poll | 110/263 |
| 4,736,693 | 4/1988 | Clomburg, Jr. | 110/263 |
| 4,865,542 | 9/1989 | Hasenack et al. | 431/160 |
| 4,887,800 | 12/1989 | Hotta et al. | 110/263 X |

Primary Examiner—Edward G. Favors
Attorney, Agent, or Firm—Ostrolenk, Faber, Gerb & Soffen

[57] ABSTRACT

A burner for the combustion of fine-grained to dusty solid fuels incorporates a central internal tube for supplying the solid fuels and an annular gap surrounding the internal tube and delimited by a cooled external tube, for supplying oxygen or oxygen-containing gas. The annular gap ends externally by an exhaust port directed obliquely relative to the longitudinal axis of the burner and peripherally surrounding the end of the central internal tube, or by a plurality of exhaust ports annularly disposed about the longitudinal axis of the burner. In order to ensure the complete combustion of the fine-grained to dusty fuels at a long service life of the burner, the inclination of the exhaust port(s) relative to the longitudinal axis of the burner is below 20°. The exhaust port(s) is/are arranged transverse to the longitudinal axis of the burner and in the radial direction relative to the same at a distance of between 5 and 30 mm from the inner wall of the internal tube. The inclination of the exhaust port(s) relative to the longitudinal axis of the burner and the radial distance of the exhaust port(s) relative to the inner wall of the central internal tube are coordinated in a manner that the intersection of the extensions of the exhaust port and of the inner wall of the internal tube outside of the burner lies 20 to 80 mm in front of the burner mouth.

9 Claims, 2 Drawing Sheets

BURNER ARRANGEMENT FOR THE COMBUSTION OF FINE-GRAINED TO DUSTY SOLID FUEL

The invention relates to a burner for the combustion of fine-grained to dusty solid fuels, in particular for use in a meltdown gasifier for the production of molten pig iron or steel pre-products, comprising a central internal tube for supplying the solid fuels and an annular gap surrounding the central internal tube and delimited by a cooled external tube, for supplying oxygen or oxygen-containing gas, which annular gap ends externally by an exhaust port directed obliquely relative to the longitudinal axis of the burner and peripherally surrounding the end of the central internal tube, or by a plurality of exhaust ports annularly disposed about the longitudinal axis of the burner.

A burner of this type is known from EP-A-0 347 002. With this burner, the oxygen is fed at an angle of between 20 and 60° to the solid fuel blown in centrally in the axial direction of the burner. Hence result turbulences and the intimate mixture of oxygen with the fine-grained solid fuel. This has the disadvantage that the fine-grained to dusty fuel supplied is poorly burnt due to the substantially more rapid combustion rate of combustible gases externally surrounding the burner or burner jet as compared to that of the fine-grained to dusty fuel.

In addition, the known burner has the disadvantage that, immediately upon the exit of the fine-grained fuel from the central internal tube, swirling with the oxygen is caused such that a burning spot is created immediately at the burner mouth. The high thermal load thus exerted on the burner mouth involves intensive wear despite water cooling of the burner mouth such that the burner itself has a short service life only.

The invention aims at avoiding these disadvantages and difficulties and has as its object to provide a burner of the initially described kind, which not only allows for the complete combustion of the fine-grained to dusty solid fuel supplied, but also has a long service life. In particular, it is to be feasible with this burner to recycle the coal particles contained in the reducing gas emerging from the meltdown gasifier and separated therefrom into the meltdown gasifier and tp burn them there during the production of molten pig iron or steel pre-products in a meltdown gasifier. A process for recycling such coal particles is described, for instance, in AT-B-381.116.

In accordance with the invention, this object is achievd in that the inclination of the exhaust port(s) relative to the longitudinal axis of the burner is below 20° and that the exhaust port(s) is/are arranged transverse to the longitudinal axis of the burner and in the radial direction relative to the same at a distance of between 5 and 30 mm from the inner wall of the central internal tube, wherein the inclination of the exhaust port(s) relative to the longitudinal axis of the burner and the radial distance of the exhaust port(s) relative to the inner wall of the central internal tube are coordinated in a manner that the intersection of the extension of the exhaust port with the extension of the inner wall of the internal tube outside of the burner is located in front of the burner mouth at a distance of 20 to 80 mm, preferably at a distance of 30 to 60 mm.

Due to only a slight formation of turbulences in the oxygen jet, it is possible, with a burner of this type, to provide a protective jacket of inert combustion gases externally surrounding the oxygen jet such that the oxygen will be available to the complete combustion of the fine-grained to dusty solid fuels. In addition, the oxygen meets with the fuel at a distance from the burner mouth such that the thermal load on the burner mouth is not that high and the incurred heat may be evacuated via the cooling means of the external tube without causing damage to the burner mouth or involving too intensive a wear of the same.

If the fine-grained to dusty solid fuels to be burnt have elevated temperatures, the internal tube suitably is provided with an internal cooling.

An additional increase in the service life of the burner suitably is obtained if the internal tube is formed by copper or a copper alloy on its outer side and of wear resisting steel on its inner side, the water-cooled external tube, in addition, advantageously being formed of copper or a copper alloy on its outer side and of wear resisting steel on its inner side.

In practice, an embodiment in which the inclination of the exhaust port(s) relative to the longitudinal axis of the burner amounts to about 12.5° has proved particularly successful.

Another preferred embodiment is characterized in that a spin piece is provided at the mouth of the internal tube, which spin piece advantageously is formed by a tube section inserted in the internal tube and on whose inner wall helical grooves are provided. This results in a more intensive blending of the oxygen present at the inner side of the tubular oxygen jet with the centrally supplied fine-grained to dusty solid fuels due to the centrifugal force, yet without destroying or eliminating the $CO_2$ protective jacket externally surrounding the oxygen jet.

Figure 2:
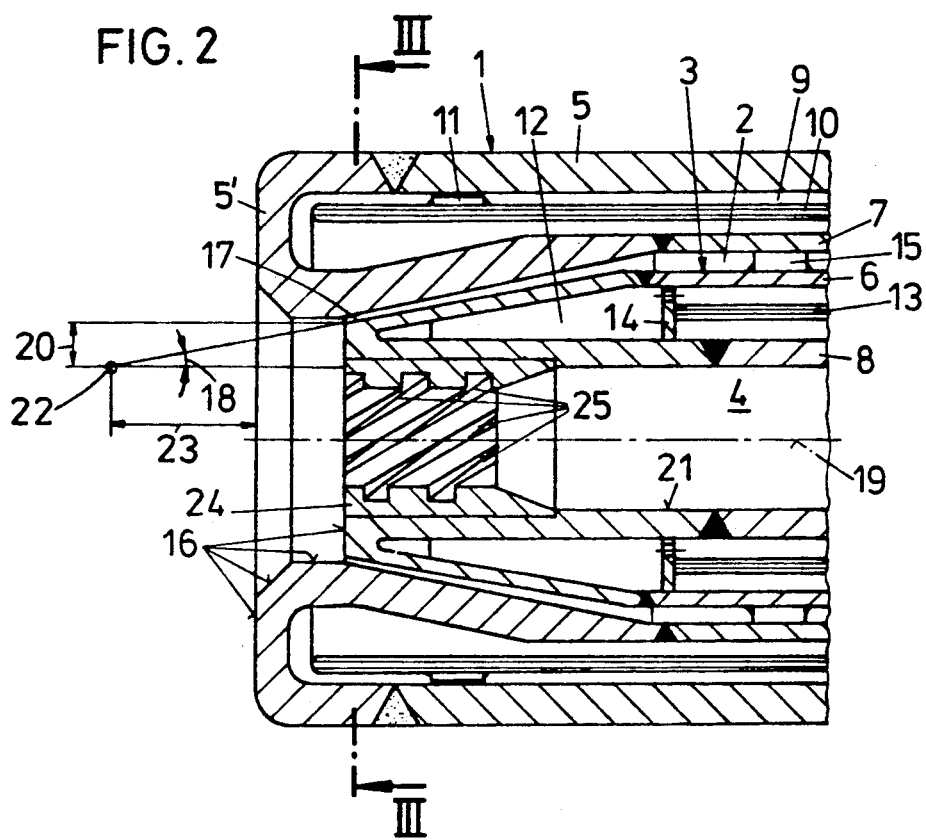
Figure 3:
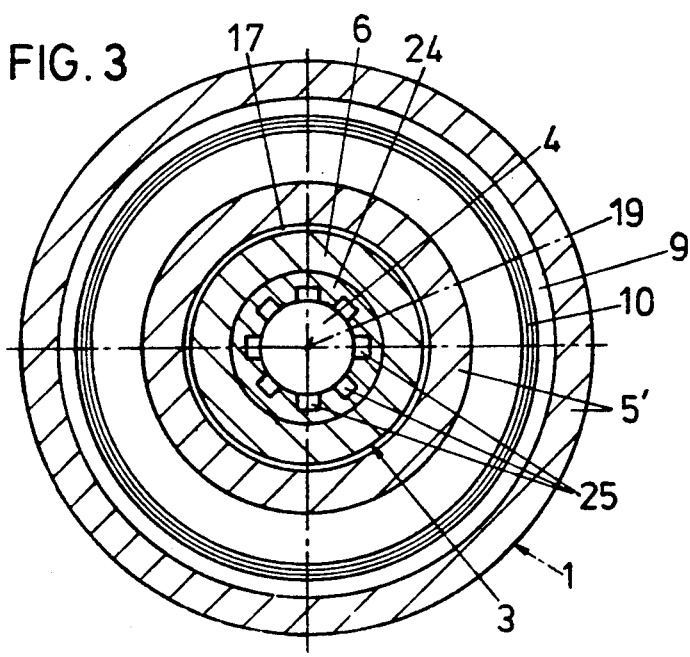

In the following, the invention will be explained in more detail by way of two embodiments illustrated in the drawing, wherein:

FIGS. 1 and 2 each illustrate an axial section through the front end of the burner according to one embodiment each; and FIG. 3 is a sectional view along line III—III of FIG. 2.

The burner illustrated in FIG. 1 comprises a double-walled external tube 1 provided with a water internal cooling, in which an internal tube 3, which is also double-walled and provided with a water internal cooling, is inserted, leaving an annular gap 2 of circularly ring-shaped cross section.

A channel 4 enclosed by the internal tube 3 and having a circular cross section serves to supply fine-grained to dusty solid fuels, while the annular gap 2 present between the external tube 1 and the internal tube 3 serves to feed oxygen or oxygen-containing gas. Both the external tube 1 and the internal tube 3, on their outer sides, are each formed by a copper tube 5 and 6, respectively. On their inner sides, jacket tubes 7 and 8, respectively, made of wear resisting steel, such as, e.g., spring steel, are provided both with the external tube 1 and with the internal tube 3.

The external jacket of the external tube 1, which is formed by copper tube 5 (or a copper alloy) joins a U-likely bent mouth piece 5' also comprised of copper or a copper alloy. This mouth piece 5', on the inner side of the external tube 1, reaches as far as into the annular gap 2 provided between the external tube 1 and internal tube 3, where the internal jacket tube 7 of the external tube 1 formed of wear resisting steel follows.

In the interior 9 of the external tube 1, a tubular insert 10 is provided for guiding and deflecting the cooling water and is held in its position by spacers 11. In the interior 12 of the internal tube 3, another tube 13 for deflecting cooling water is installed, also supported on the internal tube 3 via spacers 14 so as to be retained in its correct position. Spacers 15 are arranged within the annular gap 2 between the internal tube 3 and the external tube 1 for adjusting a central position of the internal tube 3 relative to the external tube 1.

The configuration of the burner mouth 16, in particular the mouth 17 of the annular space 2 between the internal tube 3 and the external tube 1, towards outside is of particular relevance. According to FIG. 1, the mouth 17 is designed as an annular-gap-shaped conical exhaust port, the inclination 18 of the exhaust port 17 relative to the longitudinal axis 19 of the burner, i.e., half of the angle of aperture of the cone formed by the exhaust port 17, being less than 20° and more than 5°, preferably 12.5° as illustrated in FIG. 1. Instead of the annular-gap-shaped exhaust port 17, several exhaust ports may be provided, annularly arranged about the longitudinal axis 19 of the burner.

Furthermore, the internal tube 3 is flattened on its front end, from which a radial distance 20 between the inner wall 21 of the internal tube 3 and the exhaust port 17 results. Suitably, this distance amounts to between 5 and 30 mm.

The inclination 18 of the exhaust port 17 relative to the longitudinal axis 19 of the burner is coordinated with the radial distance 20 from the exhaust port 17 to the inner wall 21 of the internal tube 3 in a manner that the intersection 22 of the extension of the exhaust port 17 with the extension of the inner wall 21 of the internal tube 3 beyond the burner mouth 16 is located in front of the burner mouth 16 at a distance 23 of 20 to 80 mm, preferably at a distance of 30 to 60 mm.

The burner functions in the following manner:

The preferred application of the burner is its use in a meltdown gasifier for the production of molten pig iron or steel pre-products. Such a meltdown gasifier is described, for instance, in AT-B 381.116. By this burner, it is possible to return into the meltdown gasifier and completely burn there, coal particles that have been separated from the reducing gas discharged from the meltdown gasifier.

The particular configuration of the exhaust port 17 and the configuration of the front end of the internal tube 3 described above effect the meeting and blending of the tubular oxygen jet forming outside of the burner with the fuel jet to take place only at the distance 23 from the burner mouth 16 such that the burner mouth 16 only is exposed to a thermal load that it is able to resist even over a longer period of time.

The slight inclination 18 of the exhaust port 17 relative to the longitudinal axis 19 of the burner causes only slight turbulent motions to be generated in the oxygen jet. As a result, the oxygen jet externally is surrounded by a $CO_2$ protective jacket formed upon reaction of the CO present in the interior of the meltdown gasifier with the oxygen of the oxygen jet to form $CO_2$ according to the equation $$2CO + O_2 \rightarrow 2CO_2.$$

This $CO_2$ protective jacket is important to prevent an endothermic reaction of $CO_2$ with carbon to CO under heat consumption according to Boudouard, i.e., according to the equation $$CO_2 + C \rightarrow 2CO.$$

Such a reaction is undesired, because it would consume heat present in the meltdown gasifier and the cold CO formed would not suffice to carry out all the necessary reactions within the meltdown gasifier, such as, e.g., the melting of coal ash and the melting of solid particles contained in the fuel jet.

The fuel contained in the fuel jet reacts with the oxygen contained in the oxygen jet according to the equation $$C + O_2 \rightarrow CO_2,$$

which reaction, to be true, proceeds essentially slower than the reaction of the CO present within the meltdown gasifier with oxygen to $CO_2$, which, however, is irrelevant on account of the protective $CO_2$ jacket.

The protective $CO_2$ jacket prevents CO from diffusing from the furnace atmosphere into the zone of the burner, thus ensuring the complete combustion of the fuel contained in the fuel jet.

Thereby, the ash particles are completely melted. Moreover, it is possible to raise to melting temperature sponge iron particles and iron dust particles present in the fuel jet such that they will gradually change into fine droplets. Thus, the accumulation of dust within the meltdown gasifier, which even might lead to an obstruction of the reduction shaft of the meltdown gasifier, is reliably avoided.

Melting of the sponge iron particles and of the iron dust particles present within the fuel jet in addition provides for a particularly efficient mode of operation of the meltdown gasifier with a high yield of molten pig iron or steel pre-products.

The embodiment illustrated in FIG. 2 approximately corresponds to the embodiment illustrated in FIG. 1 in terms of the internal tube 3, the external tube 1 and the exhaust port 17.

Yet, there is a circularly ring-shaped cylindrical spin piece 24 inserted in the channel 4 of the internal tube 3 flush with the front face of the internal tube 3 and tapering on the opposite end at an acute angle. Helical grooves 25 are worked into the internal side of this spin piece. These grooves 25 impart a spin on the fuel jet about the longitudinal axis 19 of the burner. Due to the centrifugal force created therein, this spin causes the fuel to swirl with the oxygen present on the inner side of the oxygen jet, whereas the outer side of the oxygen jet remains relatively unswirled, thus ensuring the continuance of the protective $CO_2$ layer.

The widening of the front face of the internal tube 3 caused by the wall thickness of the spin piece may be compensated for by shifting the internal tube 3 from the front face of the external tube 1 inwardly by a slightly larger distance.

What we claim is:

1. In a burner arrangement for the combustion of fine-grained to dusty solid fuel, such as for use in a meltdown gasifier for the production of molten pig iron or steel pre-products, of the type including a burner having a burner mouth and a longitudinal axis, a central internal tube having an inner wall and an internal tube mouth and adapted to supply said solid fuel, and a cooled external tube defining, with said internal tube, an annular gap for supplying oxygen or oxygen-containing gas, said annular gap ending externally by at least one exhaust port directed at an inclination relative to the longitudinal axis of said burner and peripherally surrounding the end of said central internal tube, the improvement wherein said inclination of said exhaust port relative to the longitudinal axis of said burner amounts to below 20° and said at least one exhaust port is arranged transverse to the longitudinal axis of said burner and in the radial direction relative to said longitudinal axis at a radial distance of between 5 and 30 mm from said inner wall of said central internal tube, said inclindation of said exhaust port relative to the longitudinal axis of said burner and said radial distance of said exhaust port being coordinated in a manner that the intersection of the extension of said exhaust port with the extension of said inner wall of said internal tube outside of said burner being located at a distance of from 20 to 80 mm in front of said burner mouth.

2. A burner arrangement as set forth in claim 1, wherein a plurality of exhaust ports is annularly arranged about the longitudinal axis of said burner.

3. A burner arrangement as set forth in claim 1, wherein the intersection of the extension of said exhaust port with the extension of said inner wall of said internal tube outside of said burner is located at a distance of from 30 to 60 mm in front of said burner mouth.

4. A burner arrangement as set forth in claim 1, wherein said internal tube is provided with an internal cooling.

5. A burner arrangement as set forth in claim 4, wherein said internal tube on its outer side is formed by copper or a copper alloy and on its inner side is made of wear resisting steel.

6. A burner arrangement as set forth in claim 1, wherein said cooled external tube is cooled by water and on its outer side is formed by copper or a copper alloy and on its inner side is made of wear resisting steel.

7. A burner arrangement as set forth in claim 1, wherein said inclination of said exhaust port relative to the longitudinal axis of said burner is 12.5°.

8. A burner arrangement as set forth in claim 1, further comprising a spin piece provided on said internal tube mouth.

9. A burner arrangement as set forth in claim 8, wherein said spin piece is comprised of a tube section inserted in said internal tube and having a tube section inner wall provided with helical grooves.

* * * * *

UNITED STATES PATENT AND TRADEMARK OFFICE
CERTIFICATE OF CORRECTION

PATENT NO. : 5,127,346
DATED : July 7, 1992
INVENTOR(S) : Kepplinger, et. al.

It is certified that error appears in the above-indentified patent and that said Letters Patent is hereby corrected as shown below:

On the Title page, item [73] Assignee: change "Vooest-Alpine" to --

Deutsche Voest-Alpine--.

Signed and Sealed this

First Day of February, 1994

*Attest:*

BRUCE LEHMAN

*Attesting Officer*      *Commissioner of Patents and Trademarks*